Nov. 10, 1931.  H. G. KUCK  1,831,308
FLOWER HOLDER
Filed June 15, 1929
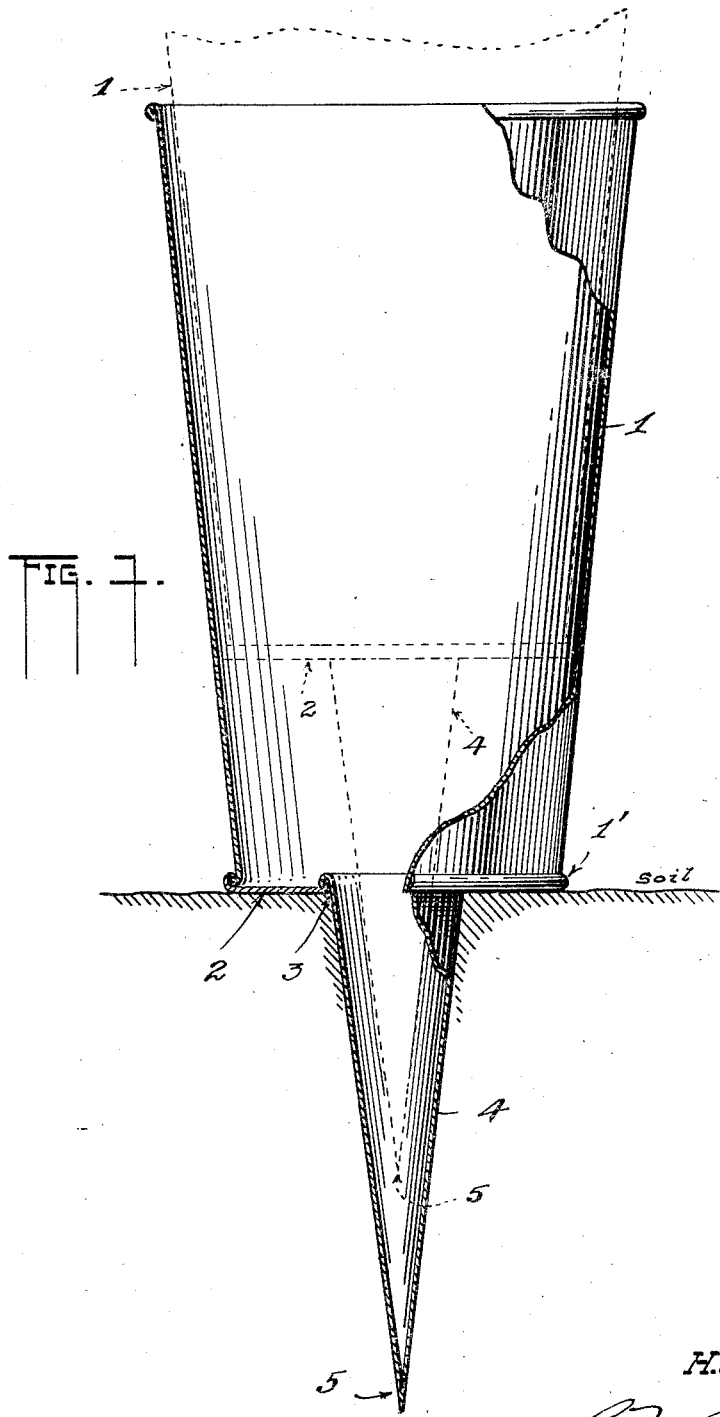
Inventor
H.G.Kuck,
By L. M. Thurlow
Attorney Patented Nov. 10, 1931

1,831,308

UNITED STATES PATENT OFFICE

HENRY G. KUCK, OF PEORIA, ILLINOIS, ASSIGNOR TO STUBER & KUCK CO., OF PEORIA, ILLINOIS, A CORPORATION OF ILLINOIS

FLOWER HOLDER

Application filed June 15, 1929. Serial No. 371,100.

This invention pertains to water containing flower holders particularly of a type adapted to be forced partially into the ground for use in cemeteries and other places.

The object of the invention is the provision of a sturdy water-tight holder for containing flowers that can be readily pushed into the soil and so constructed that it will be retained firmly and securely in upright position; that will be low in cost of manufacture; and that can be readily nested one in the other as a convenience in storage and shipment.

In the appended drawing, the single figure illustrates my invention as I prefer to make it, though the manner of connecting its parts may be varied according to desire.

In said figure, the numeral 1 designates the body of the holder which takes the form of a cup relatively long, and tapered toward its lower end.

The bottom of the holder is denoted at 2, its marginal edge and the lower edges of the walls of the body at 1' being connected as by double seaming, for example, to provide a water-tight joint. Preferably at its center the bottom 2 is provided with an opening 3 and a hollow coned member or stem 4 is seated at its large end in said opening, the adjacent edges of the cone and bottom being suitably connected in water-tight manner. The cone itself is pointed so as to be easily forced into the soil and is wholly protected against leakage of water therefrom.

The proportions of the device are such, it will be noted, that there is a considerable expanse of the bottom 2 between its edge where connected to the body 1, and the cone 4, and that the latter is comparatively long and of fairly large diameter. The wide bottom which, when in use rests upon the surface of the ground, together with the long cone presenting a large surface provide against the overturning of the holder even though the soil may be quite loose and the holder being top-heavy with flowers.

In addition to the fact that the hollow cone 4 provides a large additional water containing space, and that long stems of the flowers may be inserted therein, it provides the advantage of snug nesting so that three or four of the holders will take up comparatively little more space than a single one, this, of course, being a great advantage in storage and shipment and especially in connection with the latter since transportation charges for a given number of the holders can be kept down.

It is conceivable that the device might be made in one piece by spinning operations, perhaps, but in any event the relation of the parts to gain the advantages named would still be present.

I claim:

1. An open top water tight flower holder consisting of a container having a hollow stem substantially central of and depending from its bottom, the same being spaced from the outer edge of said bottom leaving a free exposed margin on the latter, the inner space of the stem opening into and communicating with the space of the container, being pointed at its free extremity and water tight.

2. In a flower holder, a main hollow container having a substantially flat bottom, and a hollow stem extending from said bottom, its walls being spaced inward from the outer edge of the latter leaving a free exposed margin on said bottom around said stem, the open space within the stem being in communication with the space of the main container, and said container and said stem adapted for holding a liquid.

3. In a flower holder, a main open-top body tapered toward its bottom, and a hollow stem substantially central of the bottom of said body, the same opening at one end into the latter and being both closed and pointed at its other end, both the stem and body being capable of holding a liquid, and said stem being spaced inward from the outer edge or margin of the bottom leaving a free and exposed margin on the latter surrounding said stem.

4. In a flower holder, a main open-top body tapered toward its lower end or bottom, and a hollow tapered stem substantially central of the bottom of said body, the same opening at its large end into said bottom, and being both closed and pointed at its other end, both the stem and body being capable of holding a liquid, and said stem being spaced inward from the outer edge or margin of the bottom leaving a free exposed margin on the latter surrounding the stem.

In testimony whereof I affix my signature.

HENRY G. KUCK.